3,007,656
AIRCRAFT AUTOMATIC PILOTS
Harry Miller, Brooklyn, and George F. Jude, Flushing, N.Y., assignors to Sperry Rand Corporation, Great Neck, N.Y., a corporation of Delaware
Filed Mar. 15, 1956, Ser. No. 571,813
33 Claims. (Cl. 244—77)

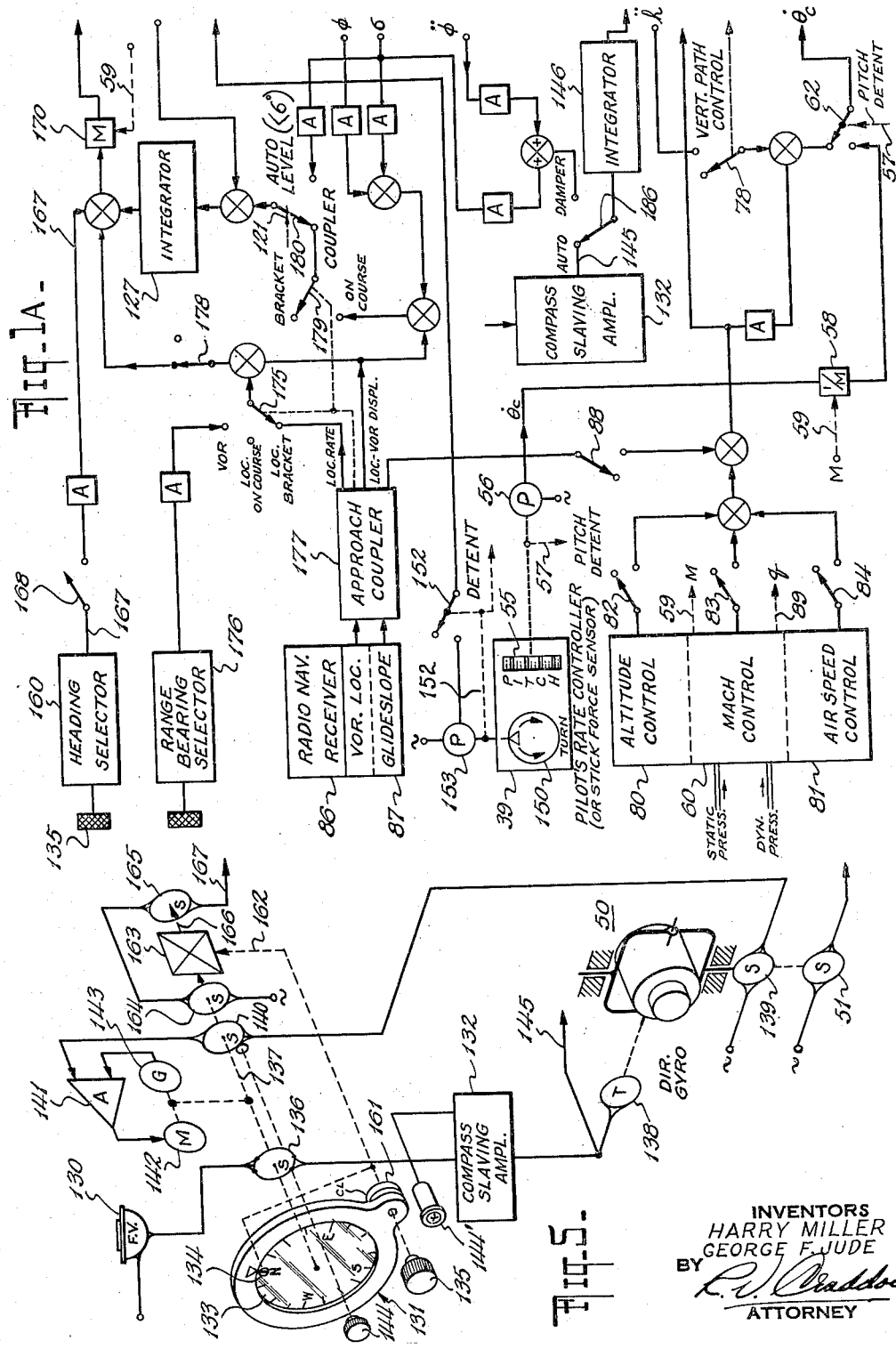

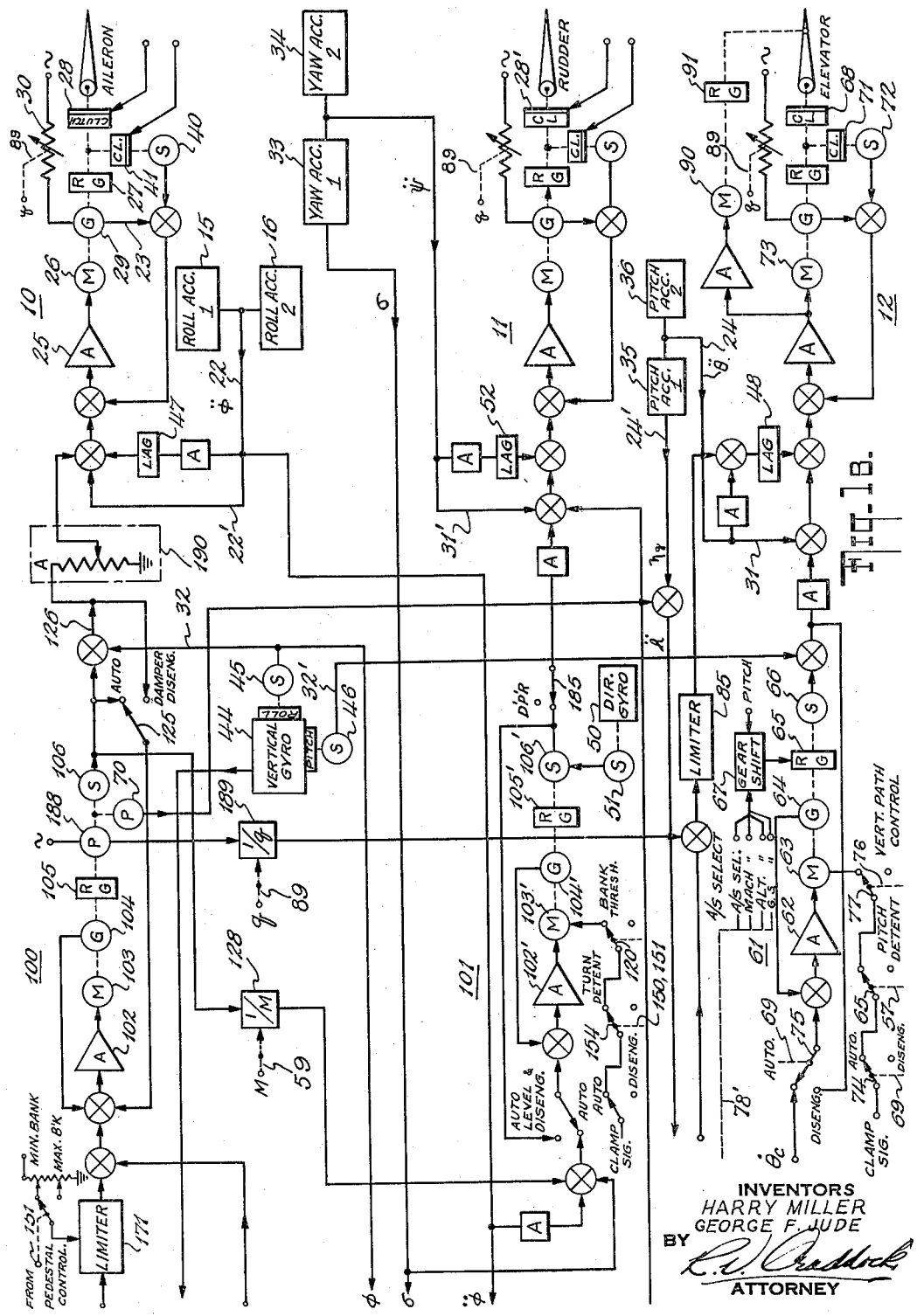

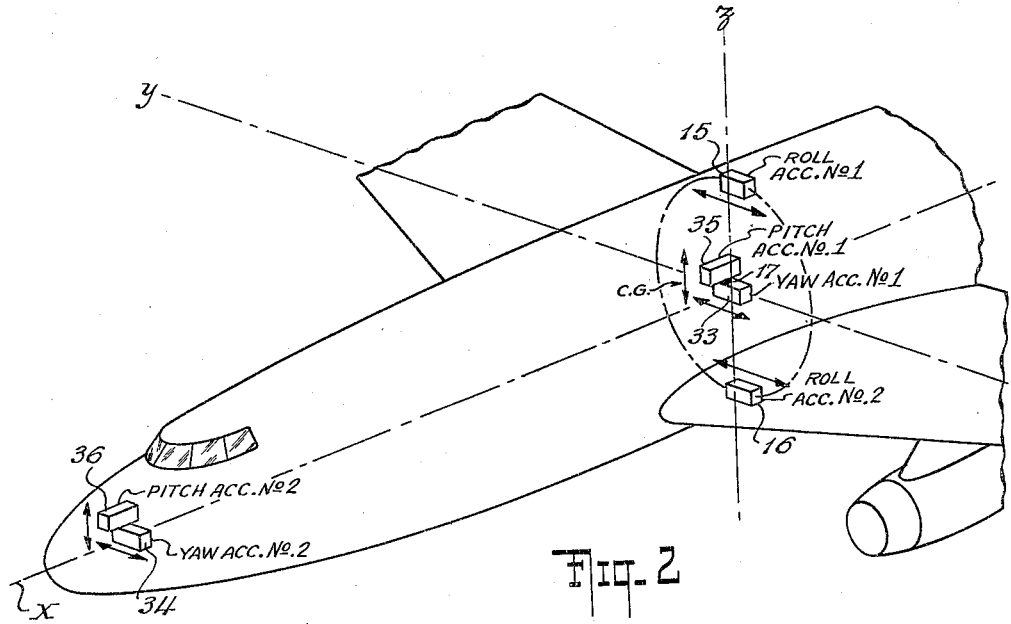
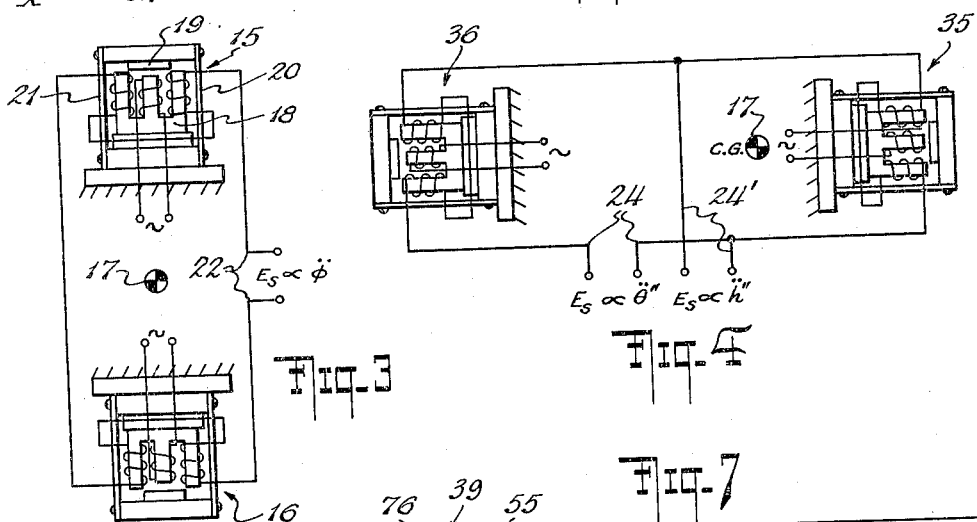
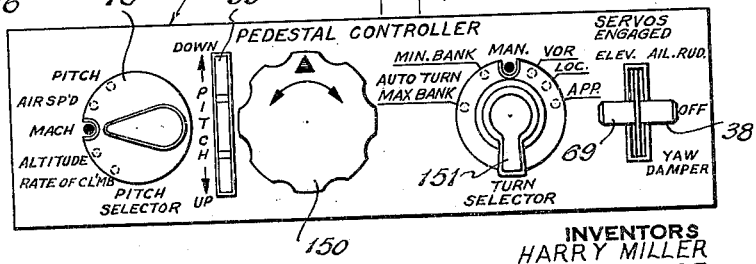

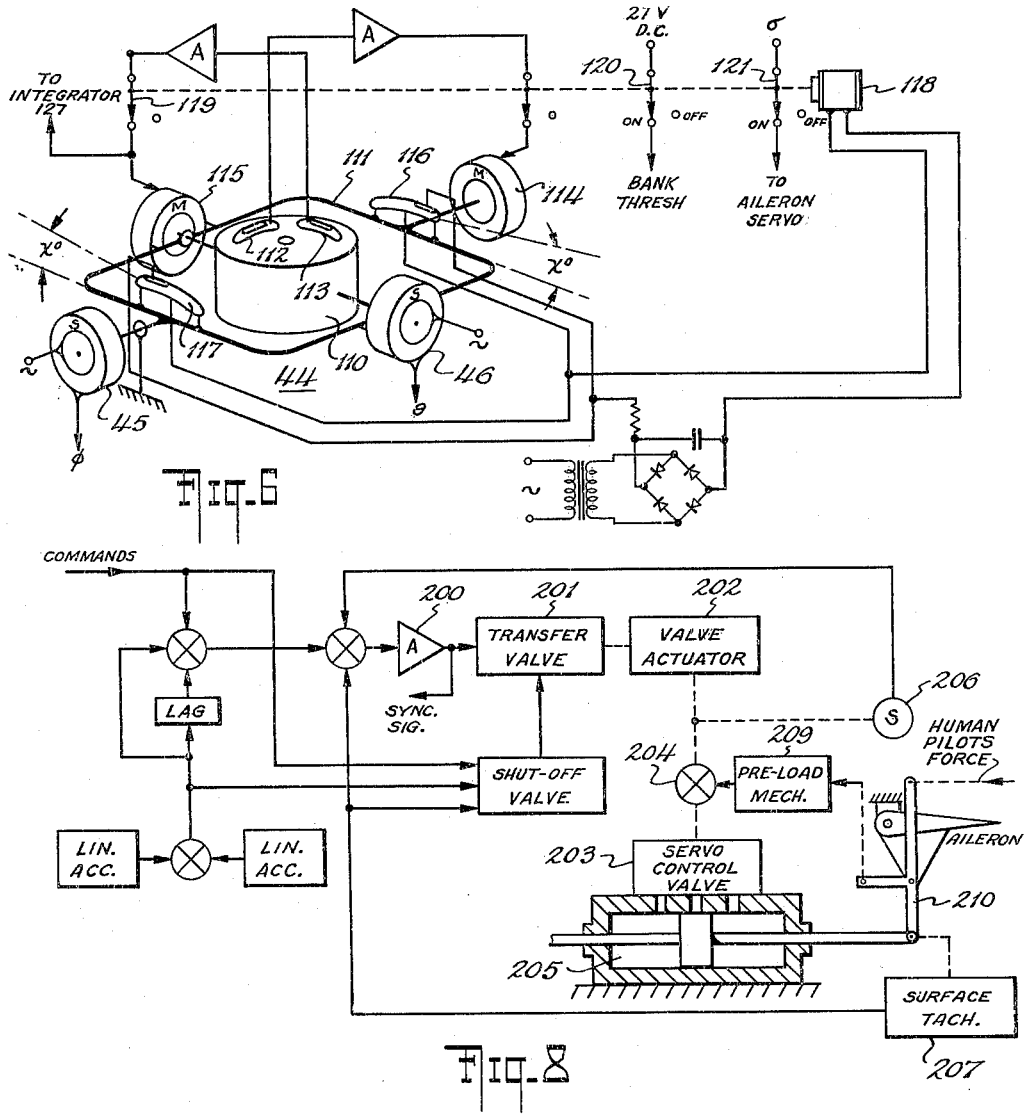

The present invention relates to automatic pilots for aircraft and more particularly to an automatic pilot for stabilizing the aircraft about its primary axes and for automatically controlling the maneuvering of said aircraft.

The automatic pilot in the present invention is particularly applicable to jet or turboprop transport aircraft which are capable of operation over a very wide range of flight conditions.

The automatic pilot of the present invention provides extremely tight or rapid response stabilization or damping of the airplane's yaw, pitch, and roll motions, and thereby is admirably adapted to provide stability augmentation of aircraft having marginal inherent stability. Short period stabilization is provided by accelerometers which provide direct measures of angular accelerations about the primary craft axes and velocity type surface servo systems which directly control the rate of surface movement in accordance with the direct acceleration measures. Thus, the highest order response to angular motioning of the craft about its axes is provided and the quickest possible control thereof is achieved. Long period stabilization is provided in the automatic pilot of the present invention by means of long period inertial references such as vertical and directional gyros for long period angular stabilization and accelerometers having integrated outputs for measuring or detecting deviations of the aircraft from a desired flight path i.e. inertial flight path stabilization. Heading control is provided by a magnetic reference such as a flux valve compass which slaves the directional gyro to magnetic north, and radio beam couplers. Further basic references for the automatic pilot are provided by air mass sensors such as altimeters, air speed sensors, and Mach sensors. Maneuvering of the aircraft through the automatic pilot may be manually or automatically commanded by means of a pedestal controller, the pilot's manual control column and radio and flight path couplers.

The automatic pilot of the present invention provides improved manual control of the aircraft by providing substantially lag-free damping about all craft axes as above described. All manual inputs during automatic pilot operation may be provided by switches located on a pedestal controller. Such switches may select in the pitch control channel, altitude control, air speed control, Mach control, radio navigation control, and manual pitch rate control; in the lateral or roll and yaw control channel, constant magnetic heading, selectable bank angle turn control, heading command control, and radio navigation control.

A principal feature of the automatic pilot of the present invention resides in the extremely tight short period stabilization of the aircraft not heretofore provided by more conventional automatic pilots. Prior art automatic pilots fall into two general classes, at least as far as their short period stabilization is concerned. In one class fall automatic pilots which derive short period stabilization by means of position maintaining gyroscopes giving displacement signals, which gyroscopes provide measures of the angles through which the aircraft rotates about its primary axes and wherein the displacement signals derived therefrom are differentiated to thereby compute or derive angular rate information. Such systems usually operate through displacement type surface servo motors which position the surfaces in accordance with the derived displacement and rate signals, surface position feedback being usually employed to close the servo loop.

Systems of the above type, while satisfactory in many respects, have certain inherent disadvantages especially when applied to high speed aircraft. For example, since the rate terms are computed as by means of R-C circuits from displacement signals, the overall gain of such a system must be kept relatively low so that variations in the craft's power supply accentuated by the rate circuits will not be troublesome. A further disadvantage of such system lies in the fact that back-lash may exist between the surface and the position feedback signal generator, thereby introducing instability into the surface servo loop. Further difficulty may arise in synchronizing, trimming and monitoring such position feedbacks servo systems.

In the other general class of prior art auto pilots are those in which rate of turn gyros are used for short period stabilization. While the use of rate gyros eliminates R-C circuits and their inherent drawbacks, further means are required to wash out the rate signals produced during command or steady state turns. Furthermore, such angular rate stabilization systems have an inherent lag since angular rates are involved rather than angular accelerations. An additional disadvantage of rate gyros resides in the fact that a high speed rotating wheel is required with its attendant wear problems. Such rate gyro stabilization systems generally require a position-type surface servo loop with its above-described limitations.

It is, therefore, the primary object of the present invention to provide an automatic pilot having high-responsive short period stabilization but which overcomes all of the above-mentioned disadvantages of prior autopilot systems.

Short period body-axis stabilization is provided in the automatic pilot of the present invention by a system of accelerometers which directly measure angular acceleration about its three primary axes, and by a surface servo system which is adapted to drive the craft control surfaces at a rate determined by these angular accelerations. Such a servo system does not require any surface position feedback because the rate of movement of the surface produces a craft angular acceleration in which case the angular accelerometers detecting such accelerations close the surface servo loop. Many advantages are derived from such an accelerometer-velocity-servo system. One advantage resides in the fact that the system provides an effective body axis damper action since surface deflection or position is proportional to aircraft angular velocity. Another advantage is the use of higher derivative information, namely angular acceleration (as compared with, for example, angular rate) which provides system flexibility in a yaw damper configuration (resulting in superior damper action for aircraft with high natural frequencies), ease of parameter control, and improved performance in the presence of body bending. A still further advantage resides in the fact that no high speed mechanical elements are required, there is no need to cancel steady state voltages during command or constant rate turns, no electronic rates are necessary, and since the damping terms are derived in aircraft axes, gimbal errors which are peculiar to both displacement and rate gyros are eliminated. Yet another advantage of the accelerometer-velocity (or integrating)-servo system resides in the fact that since the threshold sensitivity of angular accelerometers is far superior to that of displacement or rate gyros, superior damping of short period motions of the aircraft about its primary axes is achieved.

It is, therefore, a further object of the present invention to provide rapid short period stabilization by means of a velocity surface servo system which responds directly to measured angular accelerations about the primary aircraft axes.

It is a further object of the present invention to provide an extremely tight or lag-free stabilization system for aircraft by directly controlling angular accelerations of the aircraft about its primary control axes.

It is still a further object of the present invention to provide a pair of linear accelerometers respectively spaced apart along each of the craft's control axes and electrically interconnecting these accelerometers such that their outputs are direct measures of the angular acceleration of the aircraft about its primary axes, and wherein servomotor means, directly responsive to the measured accelerations are provided to control the aircraft to reduce the same toward zero.

The automatic pilot of the present invention provides an improved turn control wherein a direct measure of angular acceleration about the craft roll axis is provided for obtaining transient rudder-aileron coordination during turn entry, and turn exit and wherein a turn command produces a corresponding bank angle and rate of turn of the craft and wherein the bank command signal is also applied to the rudder control channel through a modification network which varies the magnitude of this signal as a function of air speed and altitude whereby to compensate for changing flight conditions of the aircraft.

A further feature of the present invention is to provide automatic roll leveling upon engagement of the automatic pilot wherein the magnetic heading obtaining at roll out is maintained.

A further advantage of the automatic pilot of the present invention resides in the fact that all maneuver commands and all mode switching are performed in such a manner that no abrupt transients are produced on the surface servo system. All maneuver commands and mode selection switching are inserted into the stabilization system through integrating or long time constant devices.

It is a further object of the present invention to provide an improved automatic control system for aircraft in which a high degree of stability is maintained and wherein maneuver commands may be inserted smoothly and effectively over the entire operating range of the aircraft.

It is another object of the present invention to provide an automatic pilot for aircraft adapted to operate as a yaw damper during manual control and in which, during said yaw damper operation automatic turn coordination is provided.

Other objects, features and advantages of the present invention not at this time particularly enumerated will become apparent as a detailed description of a preferred embodiment thereof proceeds, reference being made to the accompanying drawings wherein:

FIGS. 1A and 1B, taken together, is a schematic block diagram of the automatic pilot of the present invention;

FIG. 2 is a representation of an aircraft showing the location of the accelerometer elements used in the apparatus of FIGS. 1A and 1B;

FIGS. 3 and 4 are schematic electrical diagrams illustrating the electrical interconnection of the accelerometers shown in FIGS. 1A, 1B and 2;

FIG. 5 is a schematic diagram of a compass system suitable for use in the system of FIGS. 1A and 1B;

FIG. 6 is a schematic representation of a vertical gyro suitable for use in the system of FIGS. 1A and 1B;

FIG. 7 is a schematic diagram of a pedestal controller suitable for use with the automatic pilot of the present invention; and FIG. 8 is a view of a modification of a surface servo system which could be used in place of the servos illustrated in FIGS. 1A and 1B.

*The basic stabilization system*

Referring now to FIGS. 1A and 1B, the heart of the automatic pilot system of the present invention is the basic control surface servo systems for actuating the control surfaces of the aircraft. In FIG. 1B the aileron, rudder, and elevator, servo systems are indicated generally at 10, 11 and 12 respectively. Since each one of these servos are substantially identical, only one thereof will be described in detail. In the automatic stabilization of the craft against transients such as wind gusts or turbulence, tending to rotate the craft about, say, its roll axis, means are provided for directly sensing angular accelerations about this axis. Such means comprises a pair of spaced, linear accelerometers 15, 16. FIG. 2 shows that these accelerometers are preferably positioned in a plane including the vertical and lateral craft axis $z$ and $y$ respectively and are spaced preferably as far apart and as near equi-distant from the center of gravity 17 as possible. It has been found that if the roll accelerometers are placed adjacent the top and bottom of the fuselage of the aircraft, sufficient signal sensitivity will be obtained. Each of the accelerometers 15 and 16 are identical (FIG. 3) and comprise generally an E-type pick-off, the core and windings 18 of which are fixed relative to the aircraft structure and the armature 19 of which is preferably weighted and resiliently mounted on the aircraft structure by means of suitable parallel leaf spring suspensions 20 and 21 in a manner such that the linear accelerations in the direction of the arrows of FIG. 2 will generate an electrical signal in the windings 18 thereof which is proportional to this linear acceleration. The accelerometers 15 and 16 are so electrically interconnected that the two linear acceleration signals produced by each accelerometer by rolling motions of the aircraft combine to produce an output signal on leads 22 proportional to the angular roll accelerations $\ddot{\phi}$, but upon a lateral acceleration of the craft, say along the $y$ axis of FIG. 2, they will produce no electrical output since the signals produced in the respective windings 18 of each will cancel. Each of the accelerometer elements are preferably completely enclosed in a capsule which is completely filled with a damping fluid.

The aileron servo system 10 comprises a servo amplifier 25 having a very high gain characteristic connected to receive directly the accelerometer output signal. The amplifier output is applied to servomotor 26 which drives through suitable reduction gearing 27, a solenoid-operated clutch 28 or other electromagnetic clutching device. The output side of clutch 28 is directly connected with the aileron control cables or rigging. A rate generator 29 is provided for generating a signal on lead 23 proportional to the rate or velocity of servomotor operation and hence the rate of movement of the aileron. This surface velocity signal is fed back to the input of amplifier 25 such that the actual surface rate is directly proportional to the magnitude of the input signal applied to the amplifier 25. The servo system gain is continuously adjusted by means of the output of generator 29, the excitation of which may be further varied as by variable voltage divider 30. The variable potentiometer 30 is controlled in accordance with dynamic air pressure $q$ such that surface sensitivity may be adjusted for varying air speeds, altitude, and Mach.

The operation of the aileron servo loop may be readily understood by considering the effect of a wind gust operating on the aircraft which causes the craft to roll about its longitudinal or $x$-axis. The transient angular acceleration produced on the aircraft by such a gust will be directly detected by accelerometers 15 and 16 which will produce an electrical output signal which is a direct measure thereof. This signal is applied directly to the aileron servo system 10 through lead 22' which, through its high gain characteristic, will quickly drive the ailerons in a direction to oppose such roll acceleration. The surface velocity feedback signal produced by generator 29 will ensure that the rate at which the aileron is driven will be precisely proportional to the acceleration signal. Since aileron velocity produces a roll acceleration of the aircraft, the accelerometer signal serves to close the surface servo loop 10. Thus, the servomotor system 10 may be considered an integrating servo in that it integrates the acceleration signal and produces a surface deflection which is proportional to the duration of such signals, i.e. roll velocity, the velocity gain of the servo loop being adjusted by the output of the generator 29. It will be noted that the surface servo loop does not use any surface position repeat-back and therefore disadvantage of position feedback servo systems outlined above are eliminated. Since surface deflection is proportional to angular acceleration, highly effective body damping action is achieved. In other words, what amounts to acceleration feedback is provided, that is, aircraft response to surface deflection is directly measured by the spaced accelerometers thereby greatly improving the stabilizing performance under gust and body bending conditions. For example, since the angular accelerations measured by the accelerometer pair is a measure of the angular acceleration of a straight line connecting the accelerometers, body bending effects will necessarily be minimized as compared, for example, with effects of body bending on a rate gyro mounted at some one location in the aircraft at a position spaced from its C.G. Furthermore, in a rate gyro system in which the surface servo employs a measure of surface displacement, i.e. surface position feedback, if a gust is experienced tending to displace the surface, the direction of initial control action in the servo system would be to oppose such surface displacement thereby effectively increasing the gust load. On the other hand, without surface position feedback as in the present invention, there is no additional surface loading as above, and the angular acceleration resulting from the gust operates through the paired accelerometer to command an initial control surface motion that is in the desired direction for immediate damping. As above stated, such an acceleration controlled system has distinct advvantages over systems wherein rate gyros are employed for body-axis stabilization in that the inherent lag of such a system is eliminated. Other advantages of an angular accelerometer controlled body-axis stabilization system are outlined above.

It will be further noted that each surface servo loop 10, 11 and 12 are substantially identical and are completely isolated from the rest of the automatic pilot so that failures in one axis do not effect the other axes. Furthermore, such isolation enables the servo to be used for stability augmentation under manual flight conditions. For example, the rudder servo loop 11 is primarily controlled from direct measures the angular acceleration of the aircraft about the aircraft yaw or z axis. As illustrated in FIG. 2, the means for providing a direct measure of angular accelerations in yaw comprises two linear accelerometers 33 and 34 which are identical in construction to the roll accelerometers 15 and 16 and are positioned substantially as shown in FIG. 2 with one of the accelerometers 33 preferably located substantially at the C.G. 17 of the aircraft and the other, 34, placed at an appreciable distance from 33, for example in the nose of the aircraft as shown. Such a choice of position for the accelerometers is advantageous because of the usually inherent rigidity of the forward portion of an aircraft as compared to the aft portion thereof, the latter portion being prone to bending, a situation which might introduce errors in the acceleration measure.

The pitch accelerometers 35, 36 are mounted in a similar manner as the yaw accelerometers 33, 34, as illustrated in FIG. 2, accelerometer 35 being located substantially at the C.G. and the other, 36, mounted forward thereof as far as conveniently possible. The pitch accelerometers 35 and 36 and the yaw accelerometers 33 and 34 are so electrically interconnected that the accelerometer of each pair which is located at or near the center of gravity of the craft serve a dual purpose. For example, the differential electrical connections of the pitch accelerometers 35, 36 are shown in FIG. 4. During angular pitch accelerations the outputs of accelerometers 35 and 36 combine, as in the case of the roll accelerometers 15 and 16, to produce an output signal on leads 24 which is a direct measure of such angular pitch accelerations $\ddot{\theta}$. However, upon vertical accelerations of the craft along its z-axis, the linear pitch accelerometer 35 alone will provide an output signal on leads 24′ which is a direct measure thereof or $N_g$ (normal acceleration), no output appearing across leads 24, since the signals produced by each accelerometer buck out or cancel.

The accelerometers 33 and 34 are connected effectively in the same differential manner, the combined outputs thereof being a direct measure of yaw angular acceleration $\ddot{\psi}$ while the output of accelerometer 33 alone will be a direct measure of lateral linear accelerations $\sigma$ of the craft along its y axis. The electrical interconnection of the accelerometer pairs 33, 34 and 35, 36 in this manner eliminates the requirement that the accelerometers 33 and 35 be located precisely at the center of gravity of the aircraft but enable them to be located slightly away from the C.G., as dictated by structural configuration of the fuselage, without affecting the angular acceleration measures produced thereby. As a practical matter, the C.G. of an aircraft, especially of the transport type, does not vary a great deal with a consumption of fuel, location of cargo and passengers, such variations being, in most cases, considerably less than ten feet or so. It has been found that satisfactory linear and/or angular acceleration signals are obtained when accelerometers 33 and 35 are located anywhere within the normal range of movement of the craft's C.G. As a matter of fact, more care is required in determining the distance or separation between the accelerometers since it is this distance that determines to a great extent the sensitivity of the angular accelerometer outputs.

The direct measures of angular aircraft accelerations in pitch and yaw as detected by accelerometers 35, 36 and 33, 34 are respectively supplied to elevator servo system 12 through lead 31 and rudder servo system 11 through lead 31′ in exactly the same manner as the roll acceleration signals to aileron servo system 10. Thus, the aircraft is stabilized against transient craft motions about all three axes by means of extremely sensitive and rapid-response servo systems.

The solenoid-actuated clutch 28 of the aileron servo 10 and the clutch 28′ of the rudder servo 11 are provided for disengaging these servos from the surface rigging when the automatic pilot is not in use or when it is in its follow-up or synchronizing mode. A suitable rudder-aileron engage switch 38, located on a pilot's pedestal controller 39, is provided for actuating the clutches 28, 28′. The clutches may be further actuated by a safety monitor signal if a malfunction in the automatic pilot should occur during operation thereof. A safety monitor particularly suited to this autopilot is disclosed in copending application, Serial No. 623,592, filed on November 21, 1956, now Patent No. 2,973,927, in the names of Harry Miller et al., co-inventor of the present autopilot and which application is assigned to the same assignee as the present invention.

If the automatic pilot is "on" and the servos are disengaged from their respective surfaces, it is desirable that the servomotors are caused to drive in a manner to follow the position of the surface so that no engage transients will occur. However, since there is no surface position repeat back provided during normal automatic pilot operation, a synchro 40 is provided which is clutched, through clutch 41, to the output of servomotor 26 when the surface clutch 28 is disengaged. The signal output of synchro 40 is combined with the output of rate generator 29 and the combined signal is fed back to the input of amplifier 25 to thereby cause the output position of servomotor 26 to follow up on any input signal applied to the amplifier 25 as will be described. In this manner the position of synchro 40 therefor corresponds to the position of the surface at any instant. This same technique is employed in all three surface servo loops to thereby insure synchronization of the automatic pilot when not engaged such that upon engagement thereof no engage transients will be introduced.

The system thus far described provides excellent, lag-free short period stabilization of the aircraft about the primary axes thereof. Long period stabilization and flight path damping are provided by means of vertical and lateral accelerometer and displacement-type gyroscopes.

Long period angular stabilization of the aircraft about the pitch and roll axes is provided by means of a vertical gyro 44 having suitable signal generators 45 and 46 which may be of the synchro or rotary transformer type and which provide output signals respectively on leads 32, 32' proportional to the angular attitude of the aircraft about its roll and pitch axes. These signals are applied as angular displacement signals to the aileron and elevator servo systems 10 and 12 and serve to produce roll and pitch accelerations of the craft in directions to reduce the signals to zero. In order that the long term servomotor control be maintained stable, an angular rate term is derived from angular acceleration signals as shown in FIG. 1B. In the roll axis, the output of roll accelerometers 15 and 16 is a measure of roll acceleration as explained and this signal is passed through a network 47 which serves as a filter having a relatively long time constant and therefore provides in its output a signal having a phase that is lagging with respect to the phase of the original acceleration signal. By proper adjustment of the lag of the filter 47, the output thereof may be considered a transient time integral of acceleration, that is a velocity output. A conventional R-C filter or so-called integrating circuit is suitable for this purpose. It has been found that if the lag circuit 47 is adjusted to have a time constant of from one to three seconds, satisfactory damping of the surface servo system displacements is achieved. The direct acceleration signal and its integrating servo together are employed to provide a damping term for aircraft displacements about its primary axes, as described above.

The long period stabilization about the aircraft pitch axes is substantially identical to the aircraft roll axis and the pitch displacement signal 32' is similarly applied to the elevator servo loop 12. Also, the pitch acceleration signal derived from pitch accelerometers 35 and 36 is likewise lagged as at 48 to thereby supply the damping term for the pitch servo loop 12. Long period stabilization of the aircraft about its yaw or z-axis is similarly provided by a directional gyro indicated generally at 50. Here again a suitable signal generator such as synchro 51 is provided for detecting angular displacements of the craft about its z-axis. This signal is applied to the rudder servo system 11 and, as above aircraft yaw rate damping is again supplied from yaw angular accelerometers 33 and 34 and servo system damping by lag circuit 52.

It will be noted that there are no electronic rate-taking networks such as may be required in systems wherein, for example, displacement gyros are employed for body axis stabilization so that very high system gains may be advantageously employed. Furthermore, the R-C integrating networks employed are not effected by power supply transients; as a matter of fact they are advantageous because they tend to reduce or nullify the effects of such transients.

*The pitch control system*

At the high air speeds obtainable with a jet and turbo transport aircraft, the stabilization system as described above provides the required high accuracy attitude stabilization. However, the pitch maneuvering system must be similarly adapted to high speed aircraft operation and the automatic pilot of the present invention is designed to provide smooth, accurate control in response to manually and automatically applied maneuver commands over the craft's entire air speed range. As will become apparent, the pitch control of the automatic pilot of the present invention ensures excellent dynamic response, input command smoothing, gain adjustment dependent upon flight conditions, and vertical path damping.

Still referring to FIGS. 1A and 1B the pitch control system is adapted to supply maneuver commands from a pedestal controller 39 (FIG. 7) or through control column forces applied by the pilot, which commands are inserted into the pitch control system as pitch rate maneuvers rather than pitch attitude maneuvers. As illustrated in FIG. 1A such pitch rate commands may be initiated by means of pitch knob 55 (see also FIG. 7) which knob is connected to rotate a suitable signal generator 56, such as a potentiometer, which supplies a signal voltage proportional to the displacement of the knob 55. Pitch knob 55 is spring loaded so that it tends to be returned to its zero signal position and is further provided with a detent 57 at this zero position such that when the knob is moved out of detent, certain function switching occurs, as will be described. The pitch rate command signal from potentiometer 56 is modified as a function of the reciprocal of the Mach air speed at which the aircraft is flying which reduces the sensitivity of the pitch control of 55 at high aircraft speeds to insure smooth and effective control. Such signal modification is illustrated schematically at 58 wherein a shaft 59 positioned in accordance with Mach number in the Mach control unit 60 serves to vary the pitch command signal as a function of reciprocal Mach. The Mach control unit 60 may be of the character described in our co-pending application Serial No. 571,788 filed on March 15, 1956, now Patent No. 2,936,134 for Longitudinal Axis Control System for Aircraft. Theoretically, it is desirable to modify the input commands to the autopilot in accordance with ground speed since the number of g's pulled varies as a function of pitch rate $\dot{\theta}$ and the ground velocity V. However, it is difficult, practically, to do this because of the difficulty in obtaining a measure of craft ground speed. Indicated air speed or true air speed measures are obviously not satisfactory for this purpose. However, it has been found that Mach air speed is a sufficiently close approximation to ground speed and very satisfactory results are obtained by varying the pitch commands (and bank-yaw coordination command) as a reciprocal function of Mach air speed. The Mach-modified pitch rate command signal, $\dot{\theta}_c$, is applied to a pitch command computer 61 which serves to supply an error signal or voltage to the input of the elevator servo system 12. The pitch command computer 61, in this manual maneuver mode, is coupled to the pitch knob output by means of pitch detent 57 which actuates switch 62 to its lower position. At the same time, the same detent 57 operates a further switch 63 which serves to unclamp the pitch command computer 61 and render the same responsive to the pitch manual command signal.

The pitch command computer serves as a command signal smoothing network during manual pitch control of the aircraft and comprises an amplifier 62, motor 63, generator 64, reduction gearing 65, and output synchro 66. Generator 44 provides a speed feedback signal to the input of the amplifier 62 to thereby cause the motor 63 to drive at a rate accurately proportional to the magnitude of the input command signal. Therefore, the output of synchro 66 continues to increase as long as there is any pitch command signal present. Thus, the computer 61 functions as a fast follow-up on the pitch rate command signal from the pilot's controller resulting in a continued change in pitch attitude as long as the pitch command knob 55 or control column is displaced and the rate of change of pitch attitude is of course proportional to the magnitude of such displacement. Pitch command computer 61 serves the additional function of an integrator for integrating sustained vertical path error signals when the craft is being controlled in other than the manual pitch command mode. Inasmuch as it is desired to have the pitch command computer perform two separate functions, the time constant must be changed for both functions or modes of operation. For this purpose a gear shift 67 is provided in the reduction gearing 65. This may be a conventional solenoid operated gear shift which serves to insert a low reduction or high speed gearing between motor 63 and a synchro 66 during the pitch command mode of operation so that the aircraft response to the pitch command signal is fairly rapid yet smooth. However, in any of the other pitch maneuver modes, i.e. air speed keeping, altitude keeping and Mach keeping, the gear shift 67 operates to insert a very high ratio reduction or low speed gearing between the motor 63 and the synchro 66 to thereby render a pitch command computer 61 a long period electromechanical integrator under these operating conditions.

In the manual pitch control mode, the output of synchro 66 is applied to elevator servo system 12 to thereby cause the aircraft to pitch. As the aircraft pitches short period stabilization is maintained through accelerometers 35 and 36 and at the same time servo system damping is provided by means of lag network 48 as described above. The signal output from synchro 66 is nulled as the craft pitches about the vertical gyro 44. Thus, it is seen that manual pitch command signals inserted into the automatic pilot command a pitch rate maneuver rather than a pitch displacement maneuver.

It should be noted that the elevator servo 12 is engaged to the elevators of the aircraft through solenoid actuated clutch 68 as in the aileron channel, this clutch being, in turn, controlled from the pedestal controller 39 by means of servo engaged handle 69. When the servo system is disengaged the handle 69 actuates switches in the automatic pilot for placing the same in a follow up-condition. Firstly, a switch is actuated which energizes clutch 71 in the elevator servo to thereby couple synchro 72 to the output of elevator servomotor 73 so that the latter will follow-up on any signal applied to the input of the surface servo loop 12. At the same time disengage handle 69 actuates a further switch 74 which unclamps the pitch command computer 61 to thereby allow it to follow-up on the gyro signal 32'; this being possible through a further switch 75. Thus, the entire pitch channel is placed in a complete follow-up or synchronization mode ready at any instant to be engaged to the aircraft's elevator without engage transients of any kind.

As shown in FIG. 7 automatic control of the aircraft about the pitch axis may be provided so that the craft will be caused to maintain a desired air speed, a desired altitude, or a desired Mach number. For this purpose pitch mode selector knob 76 is provided.

The automatic pilot of the present invention may be automatically controlled in pitch by means of an altitude control 80, Mach control 60 and air speed control 81 (FIG. 1A), all of which modes may be generally referred to as vertical path modes. Selection of any one of these control modes will close switches 82, 83 or 84 respectively, which serves to couple their respective signals into the pitch channel of the automatic pilot. These error signals are individually supplied to the pitch servo system 12 through a limiter 85 and lag circuit 48. The function of the limiter of course is to insure that too large a pitch command signal will not be supplied to the elevator servo system which would otherwise produce a dangerous attitude or exert dangerous stresses on an aircraft frame. The function of the lag circuit 48 which, as will be recalled above, has a time constant of approximately 1–3 seconds, serves to smooth the limited command input signal to the elevator servo system 12. A further vertical path control signal derived from the radio navigation receiver 86 and particularly from the glide slope channel 87 thereof. This signal is likewise applied through a selector switch 88 operated by the turn selector knob 151 on the pedestal controller when in its "Approach" position. In each of the vertical path control modes, a vertical acceleration signal, $\ddot{h}$ as detected by accelerometer 35 located at approximately the C.G. of the aircraft as shown in FIGS. 2 and 4 is applied to the pitch command computer 61 through switch 78. Since accelerometer 35 measures only craft acceleration along its z-axis ($N_g$) its output signal must be modified as a function of bank angle to provide a measure of vertical accelerations relative to the earth. In other words, when the aircraft is in a banked turn, the vertical acceleration signal will be increased as a function of bank angle (centrifugal acceleration) and so that the elevator channel will not see this increased vertical acceleration signal as a fly-up command, the centrifugal acceleration component is cancelled out or removed from the elevator channel. This is accomplished by a functional potentiometer 70 in roll-command computer 100 (to be described) which supplies an output proportional to the desired function of bank angle, namely (1-cos $\phi$). This signal modifies the normal acceleration signal from accelerometer 35 such that the resultant accelerometer signal applied to pitch command computer 61 is proportional to $\ddot{h}$, vertical acceleration with respect to the earth. Since in any of the vertical path modes it is desired that the pitch command computer 61 operate as an electromechanical integrator and since switch 78 is actuated during any of these modes, an interconnection 78' between the switch 78 and the gear shift 67 is provided for inserting a low speed gearing between motor 63 and synchro 66, thus converting pitch command computer 61 to a long term electro-mechanical integrator. Thus, with pitch command computer 61 operating as an integrator, it serves to integrate the measured vertical acceleration to thereby provide vertical flight path damping data for the autopilot. The use of inertial elements for path damping serves to increase the system stability while at the same time minimizing the effect of static source errors from the various sensors 80, 60 and 81 and also to minimize the effect of characteristic noise in the glide slope beam during an approach.

It will be noted that the air stream data sensors 80, 60, and 81 are arranged to provide shaft rotations as a function of barometric pressure $p$, and dynamic pressure $q$. Such shafts are illustrated schematically at 59 and 89 respectively and are disclosed in greater detail in our copending application Serial No. 571,788, referred to above. Thus, means are provided for automatically varying the parameters of the automatic pilot system as a function of air speed, altitude and Mach. While the pitch axis control system has been described generally herein, a detailed analysis will be found in our above noted copending application Serial No. 571,788.

Automatic pitch trim is provided in the automatic pilot of the present invention which operates on a steady output voltage from the servo amplifier of the pitch servomotor 12. This signal is amplified and drives the elevator trim tab or the horizontal stabilizer, as the case may be, through a very high ratio reduction gearing 91.

*The lateral control system*

The lateral control system of the autopilot of the present invention may be subdivided into five modes; the automatic roll to level mode, the magnetic heading control, the turn control, the radio beam coupling mode, and the yaw damper mode.

As mentioned above, the automatic pilot of the present invention may be engaged at any time and with the aircraft in any attitude. In the automatic roll to level mode of operation of the present autopilot, the aircraft is controlled automatically to initially level the wings should the automatic pilot be engaged in a banked attitude and subsequently to maintain the magnetic heading existing when the wings roll level. In the magnetic heading control, compensation is provided which extends the stable range of high speed flight on north headings to high latitude angles where the magnetic dip angle is large. Also during constant heading operations, the aircraft is automatically maintained level without the requirement of a manual roll trim adjustment. Furthermore, turn commands are inserted by means of the pedestal controller turn knob which commands a rate of turn proportional to the displacement thereof. An automatic heading-type turn control is also provided, i.e. a turn control in which a desired magnetic heading may be selected and the aircraft automatically turns to and rolls out on the heading so selected. In this type of turn control the turn may be made with a selectable bank angle. Control column steering is also possible, means being provided to command rolling rates proportional to applied wheel force. During an ILS coupler operation or VOR range mode, the radio guidance signals command automatically banked turns.

As in the pitch channel, the aileron and rudder channels are provided with input command computers, the roll command computer being indicated generally at 100 and the yaw command computer being indicated generally at 101. Each computer is essentially the same and comprises an input amplifier 102, 102', motor 103, 103', generator 104, 104', reduction gearing 105, 105', and an output synchro 106, 106' respectively. As shown, the yaw command computer 101 is adapted to act as a rate follow-up or as position follow-up servo. When operated as a rate follow-up the output synchro 106' is driven at a speed proportional to any input signal supplied to its input, the generator 104' being provided to insure that the speed of the motor 103' is accurately proportional to the magnitude of the input signal. Thus, in the engage mode, when a turn rate is commanded and the yaw command computer is unclamped, the bank angle command, which is proportional to rate of turn, is employed to drive the yaw command computer at the rate the craft is turning as will be later described. Long term turn coordination is provided by supplying both the lateral acceleration $\sigma$ and roll acceleration $\ddot{\phi}$ signals to the yaw command computer input. In any of the automatic pilot modes the roll command computer 100 operates as a position follow-up servo to reproduce the signal applied at its input, the appropriate response being determined by the magnitude of the signal from rate generator 104.

Before describing the automatic roll leveling control system, the vertical gyro 44 will be described in more detail since its functioning is particularly pertinent in this mode of operation. Referring now to FIG. 6 there is illustrated schematically a vertical gyro adapted for use in the present automatic pilot system. The gyro 44 is generally of conventional form and comprises a rotor and rotor bearing case 110 universally mounted in the aircraft by means of a gimbal ring 111 for freedom of angular movement about the pitch and roll axes $y$ and $x$ of FIG. 2. Synchro transformers 45 and 46 are provided for producing roll and pitch attitude signals, respectively. The vertical gyro 44 is provided with conventional type gravity erection devices such as signal generating pitch and roll liquid levels 112 and 113 which, operating with or without amplification control pitch and roll torque motor devices 114, 115 for maintaining the spin axis of the rotor in alignment with the earth's gravity axis. As is known however, the gravity erection device 113 for erecting the gyro in roll is adversely affected during turns by centrifugal accelerations which tend to erect the gyro to the apparent vertical rather than to gravity vertical. In the vertical gyroscope 44 of the present automatic pilot, means are provided for detecting rates of turn for which a bank angle of greater than a predetermined number of degrees, say ±6°, is required and this means will cause erection of the vertical gyro about the roll and pitch axes to be served. Such predetermined bank angle may be referred to as the threshold bank angle. This is accomplished by providing a pair of liquid levels 116, 117 mounted on the gimbal ring 111 so that they will at all times be sensitive to horizontal accelerations of the aircraft, that is, horizontal with respect to the earth. Each of these liquid levels is mounted on the gimbal so as to be inclined to the plane of gimbal at an angle $x°$, and will serve to make contact or conduct when a horizontal acceleration is experienced which will cause the bubbles to move down the inclined liquid level capsule (see FIG. 6) thereby establishing a circuit for actuating a relay device 118. The sensitivity or inclination of the liquid levels is such that a bank angle of about ±6° will produce an acceleration which will operate the liquid level switches. Due to the fact that liquid levels 116 and 117 have opposite inclinations one liquid level will sense accelerations in one direction and the other in the opposite direction. Thus, as shown in FIG. 6 when the bank angle of the aircraft exceeds about ±6° in either direction one or the other of the liquid levels 116, 117 will conduct to thereby cause actuating current to flow in relay 118. Energization of relay 118 serves to cut out erection about the roll axis of the vertical gyro as by means of cut out switch 119. Further relays 120 and 121 will also be operated to perform specific functions in the automatic pilot as will be described.

With the automatic pilot energized but with the servomotors disengaged as by servo engage handle 38 being in its "off" position, the roll command computer 100 functions to follow-up on the bank angle signal derived from bank synchro 45 on the vertical gyro 44, such as is the case when the switch 125 is in its down position. Likewise, the yaw command computer 101 will be caused to follow-up on the directional gyro output from synchro 51. In this manner, and prior to engagement of the rudder and aileron surfaces, the roll command computer 100 and yaw command computer 101 operate to synchronize the rudder and aileron servo systems 100 and 101 with the roll and yaw attitude of the aircraft. If the aileron-rudder servomotors are engaged to their surfaces when the aircraft is in a banked attitude greater than 6° an automatic roll-out to level flight results. Under such condition, switch 120 controlled by erection cut out relay 118 (FIG. 6) operates the yaw command computer to maintain this loop unclamped and in its follow-up mode. Also, for bank angles greater than 6°, relay 118 serves to cut off the lateral pendulum or lateral accelerometer signal from accelerometer 33 (acting alone) from the control of the aileron command computer for automatic roll trim purposes, its normal function. This is accomplished through switch 121. It will be remembered that during disengagement of the aileron servo, the roll command computer 100 follows up on the bank angle signal from gyro 44 and therefore the output 126 into the servo 10 caused servomotor 26 to synchronize with the ailerons. However, upon engagement of the servos, switch 125 is moved to its up position and the bank angle signal, which was stored on synchro 106 during the follow-up mode of operation of roll command computer 100, is applied to the aileron servo system 10 to thereby command the aircraft to roll to level regardless of the roll attitude at which the ailerons were engaged. As the aircraft rolls toward level flight the yaw command computer 101 still follows-up on the directional gyro signal until the bank threshold angle of 6° is reached. As the bank angle drops below 6°, vertical gyro erection is restored and switches 120 and 121 are closed, switch 120 serving to apply the clamping signal to yaw command computer 101 which locks this computer at the magnetic heading obtaining when the 6° bank threshold was reached and switch 121 applies the lateral pendulum signal (yaw accelerometer signal 33) to the aileron command computer through integrator 127 (FIG. 1A). Since the rudder is endeavoring to maintain the craft on the heading achieved at 6° bank angle, a lateral acceleration signal will develop, which signal is integrated and employed to control the roll of the craft to a wing level condition. In this manner the aircraft is caused to roll to trim, level flight condition and to maintain the magnetic heading obtaining at that time.

Coordination during the roll out maneuver just described is obtained by feeding the bank angle signal from synchro 106 in the roll command computer 100 to the yaw command computer 101 through a modification circuit 128 which serves to vary the magnitude of this coordination signal in accordance with the reciprocal of the aircraft Mach airspeed. This modification circuit like 58, 59 in the pitch command channel, may comprise a reciprocal potentiometer having its windings excited with the bank angle signal and having the wiper thereof positioned in accordance with Mach as determined by the Mach control 60. In this manner coordination is obtained for all ground speed conditions since Mach airspeed is a close approximation to ground speed, as above described with respect to the pitch command channel.

The erection error signal from roll erection liquid level 13 is applied to the roll command computer 100 through integrator 127 for the purpose of improving aircraft operation on a northerly heading. The integral of the roll erection error is applied to roll command computer 100 in a sense opposite to the gyro roll attitude signal and it therefore tends to cancel the integrating effect of the gyro on the roll erection signal. The details and theory of this control is set forth in copending application of G. Jude et al., Serial No. 465,332 filed October 28, 1954, now Patent No. 2,834,562, for Aircraft Automatic Pilots and in the application of H. Miller, Serial No. 471,991 filed November 30, 1954, now Patent No. 2,834,563 for Aircraft Automatic Pilots. Automatic roll trim is continually provided in the autopilot system by maintaining the lateral accelerometer signal in the aileron loop through integrator 127. It has been found that a time constant of around 100 seconds is satisfactory for both integrators 127 and 146.

The basic reference during magnetic heading control of the automatic pilot of the present invention is provided by a gyromagnetic compass system. This system is schematically illustrated in FIG. 5 and comprises, generally, a directional gyro 50, a flux valve 130, a master compass indicator 131, and compass slaving amplifier 132. This compass system and the primary heading reference provided thereby can be arranged for operation in polar regions, and when used for such operations a slaving cut out switch and a latitude corrector may be employed. The compass system preferably is of the type described in copending application Serial No. 407,138, filed January 29, 1954, now Patent No. 2,887,782 in the name of J. S. Garwood, entitled Gyro Magnetic Compass System which application is assigned to the same assignee as the present invention. The master indicator 131 utilizes a rotating dial compass card 133 and a settable course or heading marker 134 which is positioned by heading selector knob 135 and is used by the human pilot to insert automatic pilot turn commands to a desired course, as will be hereinatfer described. A flux valve synchro 136 is mounted on the master indicator shaft 137 and any error in the position of this shaft from the magnetic heading detected by flux valve 130 results in a slaving error signal. This signal is applied to compass slaving amplifier 132 and a torquer 138 on the directional gyro 50 which serves to precess the gyro in a direction to reduce the error signal toward zero. The position of the gyro 50 is detected by synchro 139 and the position of indicator shaft 137 is detected by synchro 140 and are compared, the error signal being applied to a servo follow up amplifier 141. The output of amplifier 141 drives follow-up motor 142 to drive shaft 137 in a direction to reduce the error signal to zero. A speed generator 143 is provided for controlling the operation of the follow-up loop in a conventional manner. Thus, it will be seen that the master compass indicator 131 will continuously indicate the direction of magnetic north and any rapid fluctuations in the magnetic heading detector 130 will be removed by the integrating effect of gyro 50. It will be noted that the flux valve synchro 136 is mounted on the indicator 131 instead of being positioned directly by the directional gyro. This has a definite advantage in that it results in more accurate coupling of the indicator to the flux valve heading and eliminates the transmission errors inherent in repeater-type indicators. However, the magnetic heading error signal to the automatic pilot is derived from the synchro 51 which is positioned by directional gyro 50. A feature of the compass system is that the gyro is never precessed rapidly after slaving has been off for some time. This is accomplished by synchronizing knob 144 which is connected to position the stator of synchro 140 with respect to its rotor to thereby generate a synchronization voltage in amplifier 141. The motor 142 therefore drives to reduce the synchro voltage. An annunciator 144′ responsive to the output of slaving amplifier 132 serves to indicate to the pilot in which direction synchronization is most rapidly achieved. Furthermore since the gyro 50 is never precessed rapidly, it is not necessary to disconnect the automatic pilot if it is desired to reestablish slaving after it has been off for some time.

After automatic roll-out to level flight the directional gyro 50 will maintain the aircraft on the magnetic heading obtaining at roll out by means of synchro 51 which supplies heading deviation signals through now locked synchro 106′ of the yaw command computer 101 to rudder servo system 11.

In the gyro magnetic compass system of FIG. 5 flux valve 130 thereof is so constructed and mounted in the aircraft that it normally senses only the horizontal component of the earth's magnetic field. This is done by maintaining the flux valve pick-up coils in a substantially horizontal plane by means of a universal support and pendulous mass. An example of such a flux valve is described and illustrated in the present assignee's U.S. Patent 2,383,461. When such a compass system serves to control an automatic pilot it has been found that the craft tends to exhibit a slow oscillation when on a northerly heading. Such an effect comes about from the fact that if the aircraft should drift into a turn while striving to maintain straight and level flight, an error signal from the flux valve, produced by turn accelerations acting on the pendulous mass and causing the flux valve to sense a portion of the vertical component of the earth's magnetic field, will cause precession of the directional gyro in a direction causing an opposite turn. The aircraft will, therefore, be controlled in such a way as to increase the rate of turn and this will continue until an actual deviation from the desired heading is greater than this flux valve error. At this time the auto pilot will reverse the rate of turn and a similar effect occurs. As stated, the net result due to this north turning error causes a sustained oscillation of the aircraft about the north heading. It is, among other things, the integrating effect of the directional gyro on the output of the slaving amplifier 132 (responsive to the flux valve error signal) that contributes to this oscillation as in the case of the integrating effect of vertical gyro 44 on the vertical gyro leveling signals. Therefore, as above, if a further integrator, also responsive to the slaving amplifier output is provided, its output can be used to cancel the effect of the gyro integration. By tapping the output signal of the compass slaving amplifier 132 and supplying it to the rudder servo system 11 through a long time constant integrator circuit 146, the effects of the integrating action of gyro 50 and of integrator 146 will cancel if the output of integrator 146 is applied to oppose the signal from gyro 50. It has been found that northerly turning error can be compensated either by integrating the D.G. slaving signal and applying this signal to the yaw channel as above, or by integrating the vertical gyro erection error and applying this signal to the roll channel, as above, or both.

Turn control commands may be inserted into the automatic pilot of the present invention by a rate of turn command control 150, on the pilot's pedestal controller 39. This knob operates to supply a voltage proportional to a desired bank angle. However, it should be noted that instead of the turn rate command knob 150, the turn rate command signal may be produced by means of a stick force sensor mounted directly on the control column. Turn command knob 150 is rendered operable when the turn selector knob 151 is in the position shown in FIG. 7, and upon rotation thereof a detent switch 152 (FIG. 1A) is closed which supplies a voltage from potentiometer 153 proportional to the direction and extent of movement of the knob 150, this signal commanding a rate of turn as follows. The turn command signal is applied to roll command computer 100, which drives synchro 106 through an angle proportional to this signal by means of follow back switch 125 (servos engaged) connecting the output of synchro 106 to the input of the roll command computer. Rotation of synchro 106 therefore commands a bank angle of the craft proportional to the deflection of the turn control knob 150 through aileron servo 10. The bank angle thus established is maintained against short period disturbances by means of roll accelerometers 15 and 16 as pointed out above. The output of roll command computer 100, i.e., the signal generated in synchro 106 is applied to yaw command computer 101 through the Mach reciprocal control 128. In this manner the bank angle command signal to the rudder channel serves to coordinate the turn maneuver over the entire air speed range of the aircraft. With turn selector knob 151 in the position shown the detent of turn knob 150 serves to unclamp yaw command computer 101 rendering it responsive to any signal supplied thereto. It should be noted that selection of any of the other turn modes through turn selector 151 serves also to actuate turn detent switch 154 of yaw command computer 101.

The bank angle signal applied to yaw command computer 101 serves to supply a yaw command signal through the resulting rotation of synchro 106'. If the craft turns at the same rate as synchro 106' the resulting rotation of synchro 51 on directional gyro 50 will be the same and no signal will be supplied to rudder servo 11 under such steady state turn conditions. This will occur if the bank angle and rate of turn computations performed by roll command computer 100 and yaw command computer 101 respectively have been correct. If an error in computation occurs the craft will slip or skid, that is, will experience a lateral acceleration $\sigma$. Such acceleration will be detected by accelerometer 33 (acting alone) and this signal is applied to operate yaw command computer 101 in a direction to reduce such acceleration which thereby provides long period turn coordination. Of course, short period turn coordination may be provided by supplying the output of accelerometer 33 as a direct input to the rudder servo system 11. A further function of the lateral acceleration signal is to correct for erroneous rotation of synchro 51 produced by gimbal errors in the directional gyro 50 caused by craft bank angle.

Of course, a finite time is required for the bank angle commanded to be established and in order to coordinate the maneuvering during this transient turn condition, a signal proportional to roll acceleration $\ddot{\phi}$, as detected and measured by accelerometers 15 and 16, is applied to yaw command computer 101. This acceleration signal is in effect integrated by the yaw command computer, that is, it operates to correct the speed of operation of computer motor 103' during transient rolling of the aircraft. In effect this acceleration signal serves to overcome the adverse yaw effect inherent in most aircraft so that excellent transient coordination during turn entry and turn exit is provided. It will be noted that the basic maneuver command signal inputs to the aileron servo 10 and rudder servo 11 are not interrupted thereby insuring smooth, transient-free operation of the surface servos. In other words all signal switching occurs only at the inputs of the command computer devices and integrating devices.

In any of the turn command modes means are provided for compensating for loss of lift of the wings during banked maneuvers by commanding a pitch up attitude of the craft. For this purpose a functional potentiometer 188 in the roll command computer supplies a signal proportional to a function of bank angle, viz $1-\cos \phi$. This signal is applied to the elevator servo system 12 through a modification circuit 189 and pitch limiter 85. The modification circuit 189 serves to modify this cross-feed signal as an inverse function of impact or dynamic pressure $q$. This circuit adapts the cross-feed signal to the pitch servo for all air speed conditions of the aircraft. The roll-pitch cross-feed signal is applied to the elevator servo through lag network 48 and limiter 85 thereby to insure smooth and stable operation of the aircraft in pitch in accordance therewith and to prevent too large an elevator deflection that would otherwise cause a dangerous pitch attitude maneuver.

In accordance with a further feature of the automatic pilot of the present invention, vernier control of heading is provided to simplify navigational procedures, i.e., for enabling the craft to be turned through a desired angular heading change. This is accomplished by means of the heading selector 160 of FIG. 1A, the details of which are shown in FIG. 5. The master compass indicator 131 is provided with a heading selector knob 135 which, when pushed in and rotated, disengages clutch 161 and rotates one input shaft 162 of a mechanical differential device 163. Rotation of input shaft 162 also adjusts the position of heading selector or course marker 134 relative to the rotatable dial 133. The other input to differential 163 is the existing compass heading which the craft is on and is represented by the position of shaft 137. A synchro 164 on shaft 137 establishes a magnetic vector in the stator of a further synchro 165, the rotor of which is mounted on the output shaft 166 of differential 163. When the course marker 134 is rotated to the desired new heading, the rotor of synchro 165 is rotated in a proportional amount and the signal voltage on the output 167 of synchro 165 is a measure of the error between the present course and the course it is desired to fly.

This automatic turn mode is selected by rotating turn selector knob 151 on the pedestal controller 39 to either of the automatic turn positions (FIG. 7). In one position, the turn will be made at some maximum arbitrary bank angle and in the other position at some minimum arbitrary bank angle. Also, turn selector knob 151, operates to close switch 168 (FIG. 1A) and to thereby supply the turn command signal to the roll command computer 100. This error signal is modified in accordance with the Mach air speed of the craft by means of shaft 59 which is positioned in accordance with the craft Mach in Mach control 60. This modification circuit 170 may be a variable resistive element having its winding excited by the turn command signal and its wiper positioned in accordance with M. In this manner, the sensitivity of the automatic pilot and particularly the turn command computer 100 is adjusted as a function of Mach to ensure stable and effective operation over the entire air speed range of the craft. The turn command signal, after modification, is applied to a limiter 171 which serves to limit the magnitude of the input signal to roll command computer 100 and thereby limit the magnitude of the bank angle commanded thereby. Such limiting is necessary since if a very large heading change is selected, the craft might otherwise roll to a too large and dangerous bank angle. As stated above, the automatic turn from an existing heading to a desired heading may be made at selectable bank angles, these angles being determined by varying the limits imposed on the limiter 171 as schematically shown.

Automatic turn commands may be inserted into the automatic pilot of the present invention by means of radio guidance information. In this mode of operation, the turn selector switch 151 is positioned to one of the radio control positions. In the VOR position, switch 175 is positioned to its upper contact (FIG. 1A) thereby connecting a range bearing selector 176 into the roll command computer 100 and at the same time switch 178 is closed connecting VOR radio displacement error signals (from radio navigation receiver 86 and from approach coupler 177) into the same computer, both of which signals serve as command turn signals. Switch 180 is also moved from its auto-level position to its approach position or coupler through a suitable interlock between selector switch 151 and relay 118. The range bearing selector 176 may preferably be of the type disclosed in U.S. Patent No. 2,732,-550, granted January 24, 1956, which patent is assigned to the same assignee as the present invention.

When it is desired to couple to a VOR radio beam the range baring selector 176 is initially set to the bearing of the beam it is desired to fly. Once set, a heading signal is supplied having a phase and magnitude proportional to the angular displacement of the craft from the bearing so selected. This signal is combined with the VOR displacement signal and supplied to roll command computer 100 to thereby command the aircraft to turn in a direction to reduce this signal. In the range of mode the heading deviation signal functions to provide beam damping, i.e. to provide an asymptotic approach to the range beam, since the heading deviation signal determines the rate at which the aircraft approaches the beam.

An automatic approach to an ILS radio beam may be divided into three phases; a bracketing phase, an on-course phase and a glide slope phase. When it is desired to couple to a localizer beam, turn selector switch 151 is turned to the LOC position causing switch 175 to move to its down position. Switch 178 remains closed during all radio control modes. In the bracketing mode, beam displacement signals are applied to roll command computer 100 as before but instead of the heading deviation signal being employed for providing the rate of approach term, the approach coupler 177 provides a further output signal which is proportional to the rate of change of the displacement signal. This signal is combined with a radio displacement signal and the algebraic sum thereof is applied to the roll command computer 100 as a turn command signal. The craft will proceed asymptotically to approach the center of the localizer beam. However, when the displacement of the craft from the radio beam drops to a predetermined low value a beam sensor in the approach coupler 177 (see copending application S.N. 447,176 referred to below) operates automatically to switch 175 to its middle or on-course position and at the same time operates switch 179 from its bracket position to its on-course position. In this manner the on-course phase of the approach is automatically instituted. During the on-course phase, the beam displacement signal in addition to being applied directly into the roll command computer 100 is also applied to integrator 127 through switches 179 and 180. In this manner the effects of aircraft mistrim during the approach mode are compensated such as for example, unsymmetrical power from the motors of a multi-engined craft. Lateral damping of the craft during the on-course phase is provided by deriving from aircraft inertial references a signal proportional to the substantially perpendicular rate of departure and approach of the craft relative to the beam. This signal is computed from a measure of the lateral acceleration of the craft along its y axis as provided by yaw accelerometer 33 and a signal proportional to bank angle of the craft as provided by vertical gyro 44. The function of the bank angle signal is to compensate the accelerometer output so that an accurate computed measure of craft horizontal acceleration is provided. This signal is likewise integrated by integrator 127 through switches 179 and 180. Thus, the output of integrator 127 is a function of the rate of movement of the craft with respect to the beam. This signal is likewise applied to roll command computer 100 to thereby command a bank angle and hence a turn of the craft in the direction to reduce this signal toward zero.

It will be noted that the turn commands whether inserted manually or through radio means are applied to the roll command computer 100 through the Mach modification circuit 170. In this manner the turn commands are modified substantially in accordance with ground speed. This is especially important during radio beam coupling since the primary displacement error signal is generated in terms of ground- based references.

Glide slope coupling is initiated by throwing switch 151 to its glide slope position thereby connecting the glide slope radio signals to the pitch channel of the automatic pilot through limiter 85 and a lag network, the turn channel switching remaining the same as above. As in the altitude, airspeed and Mach keeping modes, steady glide slope errors are integrated by operation of the pitch command computer 61 to thereby provide accurate long term beam coupling.

For a further description of the automatic approach control reference should be made to copending applications of H. Hecht et al., Serial No. 447,176 filed August 2, 1954, now Patent No. 2,801,059, for Radio Controlled Craft Guidance System and of Hecht et al., Serial No. 460,794 filed October 7, 1954, now abandoned, for Radio Controlled Craft Guidance System, and of H. Miller, Serial No. 471,991 filed November 30, 1954, now Patent No. 2,834,563 for Aircraft Automatic Pilots, all of these applications being assigned to the same assignee as the present invention.

The automatic pilot of the present invention may be used as a yaw damper during manual control of the aircraft. Such operation is performed by moving the aileron rudder engage handle 38 to its downward position in FIG. 7. Such movement operates switches 125 and 185 in the roll command computer 100 and the yaw command computer 101 respectively which removes the long period craft stabilization references from craft control but retains the short period craft stabilization references for short term craft control. In the roll command computer 100 switch 125 is thrown to its down position thereby causing this computer to follow-up on the vertical gyro roll signal. Likewise, switch 185 in the yaw command computer 101 is moved to its up position, thereby severing the directional gyro 50 from the system. Thus, in the yaw damping mode, the angular accelerometers 33 and 34 serve as a highly sensitive or rapid responsive yaw damper for damping any yaw motion of the aircraft. A further feature of the present invention when operating in the yaw damping mode is that manually instituted turns are automatically coordinated so that the pilot need only to bank the craft to turn. When the yaw damping mode is selected, a switch 186 (FIG. 1A) is thrown to the right, thereby applying a signal proportional to the sum of roll angular acceleration and lateral acceleration to the integrator 146. The integral of this signal is applied directly to the input of the rudder servo 11 which moves the rudder in the manner automatically to coordinate any turn manually commanded by the pilot. A further feature of this yaw damper mode is that manual over-powering of the rudder is facilitated because acceleration information rather than velocity or rate information is employed as the primary servo control term. Furthermore, since there is no surface position repeat-back in the rudder servo, the pilot may manually trim the rudder at will when the auto pilot is operating in the yaw damper mode. Such condition might arise if the aircraft suddenly loses power from an engine on a multi-engined aircraft.

It is possible that some aircraft configurations may have excessive roll reaction to rudder deflections and for such aircraft the output of the roll angular accelerometers 15 and 16 in addition to being supplied to the rudder servo system 11, for turn coordination purposes during yaw damping, may be applied directly to the aileron servo system 10 thereby providing roll damping as well as yaw damping.

In FIG. 8 there is illustrated a modification of the basic surface servo system illustrated at 10, 11 and 12 of FIG. 1B wherein hydraulic servos are employed rather than electrical servos. In this case, the angular accelerometer signal is applied to the input of the servo amplifier 200, where it is amplified and used directly to actuate a conventional hydraulic transfer valve 201. The transfer valve positions a conventional valve actuator 202 which is connected to the main hydraulic servo control valve 203 through a differential 204 which in turn supplies high pressure hydraulic fluid to the main surface actuator 205 to thereby position the aileron. In the case of a hydraulic servo, the position of the valve actuator 202 controls the rate of movement of the main actuator and surface. Therefore, synchro 206 connected to the valve actuator provides a position feedback signal to the input of the servo amplifier 202 which causes the differential pressure across the actuator 205 to be proportional to craft angular acceleration, thereby, in effect, providing surface velocity feedback to cause the control surface rate to be proportional to craft acceleration. However, to insure very tight surface velocity control, a tachometer 207 connected with actuator 205 is also provided. As in the case of the servos of FIGS. 1A and 1B, the servo gain is adjusted continuously by varying the valve actuator synchro excitation and the surface tachometer excitation in accordance with air speed and altitude data. A force feedback preload 209 is provided for enabling angular motion of the feel lever 210 to operate the servo control valve 203 directly when the automatic pilot is not in use. In the case of a hydraulic actuator of the character illustrated in FIG. 8 the synchronizing voltage for the automatic pilot during the follow-up mode is taken from the output of the servo amplifier 200 and fed back to the inputs of the input command computers 100, 101 and 61.

In the drawings, a number of small rectangles are illustrated and are designated by the letter A. It is intended that all of these blocks are to be considered as signal attenuators which enable the various signals applied thereto to be controlled, in magnitude, to the desired level. Such a device is illustrated schematically at 190 in FIG. 1B. Furthermore, throughout the drawings, crossed circles have been used to schematically represent an algebraic summation of all the signals supplied as inputs thereto. Likewise, the circles labeled P designate potentiometers for providing an electrical signal which is a function of the mechanical inputs thereto. Also, the circles labeled S schematically represent signal transformers or selsyns or synchros which may be of the single or multiple phase type. The circles labeled M and G schematically represent motors and generators, respectively.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A substantially lag-free automatic stabilization system for an aircraft having control surfaces for angularly moving said aircraft about its primary axes comprising, accelerometer means for directly measuring angular accelerations of said craft about said axes, servomotor loops associated respectively with said accelerometer means and each loop having its input connected with one of said accelerometer means so as to be controlled in accordance with the angular acceleration of the craft and having its output connected with respective control surfaces, said servo loops each including means responsive to control surface movement for causing said surfaces to be driven at rates proportional to said measured angular accelerations and through angles proportional to the time integral of said measured angular accelerations, respectively, whereby to produce a surface deflection proportional to aircraft angular velocity.

2. A system of the character set forth in claim 1 wherein the servomotor loops each further includes a high-gain amplifier connected to receive the measure of angular acceleration, and wherein the means for causing the surfaces to be driven through angles proportional to the time integral of the measured accelerations includes means for measuring the rate of movement of the surface and means for additionally controlling said amplifier in accordance with said surface-rate measure.

3. A substantially lag-free automatic stabilization system for an aircraft having a control surface for moving said aircraft about one of its primary axes comprising, accelerometer means for providing a signal which is a direct measure of the angular acceleration of said craft about said axis, a servomotor loop associated with said accelerometer means having its input connected to receive said acceleration signal so as to be controlled in accordance with the angular acceleration of the craft and having its output connected to drive said surface in response to said signal, means responsive to the output of said servomotor for providing a signal proportional to the speed of operation thereof, and means for additionally controlling said servomotor loop in accordance with said speed signal whereby to effect an angular displacement of said surface proportional to the time integral of said measured angular acceleration and proportional to craft angular rate about said axis.

4. In an automatic stabilization system for aircraft having a control surface for moving said aircraft about a primary axis thereof, a high-gain servomotor system connected with said surface and including a surface velocity feedback signal for causing movement of said surface at a rate determined by the magnitude of the input to said servomotor system whereby to control the angular acceleration of said craft about said axis, means for providing a signal proportional to the angular displacement of said craft about said axis from a datum position, means for supplying said displacement signal as an input to said servomotor system whereby to tend to drive said surface in a direction to reduce said displacement signal, accelerometer means for providing a signal proportional to the angular acceleration of said craft about said axis, and means for supplying said acceleration signal to said servomotor system so as to produce a rate of operation of said control surface dependent upon the angular acceleration of said craft and in a direction to oppose such acceleration.

5. The stabilization system of claim 4 further comprising means responsive to said acceleration signal for supplying a measure substantially proportional to a transient time integral thereof whereby to provide an approximate measure of the angular rate of said aircraft about said axis, and means for additionally supplying said last measure to said servo system in a sense to oppose angular displacement and angular acceleration signals.

6. Automatic pilot apparatus for aircraft having control surfaces for controlling angular movements of said aircraft about its primary axes comprising accelerometer means for providing a signal as a measure of angular accelerations of said aircraft about said axes, integrating servomotor systems responsive to said acceleration signals and connected to drive said control surfaces and further including means responsive to control surface movement for producing control surface displacements proportional to the time integral of said acceleration signals.

7. Apparatus as set forth in claim 6 wherein said accelerometer means comprises a pair of signal-producing accelerometers relatively displaced along a straight line in said aircraft substantially normal to the axis about which angular movements of the said aircraft are to be stabilized, and means for differentially connecting the output signals of said accelerometer means for producing a resultant output signal proportional to the angular acceleration of the straight line connecting said accelerometers.

8. In an aircraft automatic pilot system the combination comprising first and second accelerometer means for producing signals proportional to linear acceleration of said aircraft at the respective positions thereof in said aircraft, said first accelerometer means being located substantially at the center of gravity of said aircraft and said second accelerometer means being displaced at a distance from said first accelerometer means along a line in said aircraft substantially normal to a primary craft axis, means differentially connecting the outputs of said accelerometer means for producing a resultant output control signal proportional to the angular acceleration of said straight line connecting said accelerometers and hence proportional to the angular acceleration of said craft about said primary axis, and means connecting the output of said first accelerometer means independently of the output of said second accelerometer means for producing a control signal proportional to linear accelerations only of the center of gravity of said aircraft along an axis normal to both said normal line and said primary axis.

9. An automatic control system for stabilizing an aircraft against external forces tending to rotate the craft about at least one of its primary axes, said aircraft having a control surface for moving the craft about said primary axis, said system comprising a servomotor having its output connected to drive said control surface, control means for said motor, means responsive to the operation of said servomotor and control surface for producing a signal having a magnitude and sign which is a measure of the angular velocity of said surface, accelerometer means responsive to the actual angular accelerations of said aircraft about said axis for producing a signal having a magnitude and sign which is a measure thereof, and means for combining said signals and supplying the resultant thereof to said servomotor control means.

10. An automatic control system as set forth in claim 9 further including means responsive to said angular acceleration signal for providing a signal proportional to a transient time integral thereof, and means for supplying said transient integral signal to said combining means in addition to said surface rate and acceleration signals.

11. In a coordinated turn control system for aircraft automatic pilots having control surfaces for controlling the roll and yaw attitude of the craft and servomotor systems for controlling said surfaces, the combination comprising accelerometer means for providing a signal proportional to the roll angular accelerations of said aircraft, means for supplying a command signal proportional to a desired bank angle of said craft, means for supplying said command and said angular acceleration signals to said roll surface servo system whereby to cause said craft to bank to said desired bank angle and thus turn at a rate dependent thereon and thereafter to be stabilized at said bank angle by said accelerometer signal, integrating means responsive to said roll acceleration signal for supplying a signal substantially proportional to a time integral thereof, and means for supplying said time integral signal to said rudder servomotor system to oppose transient yaw of said craft during turns.

12. The combination set forth in claim 11 further including a second accelerometer means for measuring lateral accelerations of said craft and for supplying a signal proportional thereto, and means for additionally supplying said lateral acceleration signal to said integrating means whereby to provide long term coordination during said turn.

13. In a coordinated turn control system for aircraft automatic pilots comprising a signal-responsive aileron servomotor system for controlling banking of said aircraft, a signal responsive rudder servomotor system for controlling yawing of said aircraft, means for supplying a turn command signal to said aileron servomotor system for producing a bank angle of said aircraft in accordance with said command signal whereby to establish a desired rate of turn of said aircraft, motive means responsive to said turn command signal for causing a rate of operation of said motive means in accordance with said command signal, means responsive to the operation of said motive means and to the actual rate of turn of said craft for supplying an output signal proportional to the difference therebetween, means for supplying said output signal to said rudder servomotor system, accelerometer means for measuring the angular acceleration of said aircraft about its roll axis and for supplying a signal proportional to such angular acceleration, and means for supplying said roll acceleration signal to said motive means for preventing adverse yaw of said aircraft during turns.

14. The combination set forth in claim 13 further including second accelerometer means for measuring lateral accelerations of said craft and for supplying a signal proportional to such lateral acceleration, and means for additionally supplying said lateral acceleration signal to said motive means whereby to provide long term coordination during said turn.

15. In an automatic pilot for aircraft having roll and yaw control surfaces and servomotors for controlling said surfaces, roll and yaw attitude references and means for normally controlling said servomotors therefrom to cause said craft to fly straight and level, turn command means for causing said craft to bank and turn through said roll and yaw references, means responsive to lateral acceleration of said craft, means responsive to the operation of said turn command means for additionally controlling yaw of said craft in accordance with said lateral acceleration responsive means in a sense to reduce said acceleration and thereby to coordinate said turn, and means responsive jointly to said turn command means and to a predetermined value of bank angle for reducing said lateral acceleration through said roll reference.

16. In an automatic pilot for aircraft having surfaces for moving said craft about its roll and yaw axes, roll and yaw servomotor system disengageably coupled with said surfaces, roll and yaw attitude references for providing signals upon departure of said craft from straight and level flight, means for supplying said roll and yaw attitude reference signals to said surface servomotor systems for causing the latter to follow the movement of said craft about said attitude references during disengagement thereof from said surface whereby upon engaging said servomotors and said surfaces the craft will experience no transient change from the attitude it was in prior to such engagement, roll and yaw follow-up servo loops having their inputs connected to receive said attitude reference signals during disengagement of said servomotor system for continuously supplying outputs proportional to the instantaneous roll and yaw attitude of the aircraft, and means operable upon engagement of said surfaces for disconnecting said roll attitude reference signal from the input of said roll follow-up loop and for supplying the output of said roll follow-up loop to its input whereby to cause said roll follow-up loop to reduce such output toward zero, and simultaneously to supply such output to said roll surface servomotor system whereby to cause said craft to roll to a level flight attitude, means for disconnecting said yaw attitude reference signal from the input of said yaw follow-up servo loop and for simultaneously supplying the output of said roll follow-up servo loop to the input of said yaw follow-up servo loop whereby to produce a coordinated maneuver to said level flight attitude.

17. Apparatus as set forth in claim 16 further including means responsive to the roll attitude of said craft for locking said yaw follow-up servo loop when the roll attitude of the craft reaches a predetermined low value whereby to cause said craft to maintain the yaw attitude then obtaining.

18. In an automatic pilot for aircraft having a control surface for stabilizing the craft about one of its axes, a servomotor for adjusting said surface, means responsive to angular accelerations of the craft about said axis for providing a signal having a magnitude and sign which is a measure thereof, means responsive to the speed of said servomotor for providing a counter signal having a magnitude and sign which is a measure thereof and means for controlling said servomotor from the algebraic sum of said signals.

19. A yaw damper for aircraft having a yaw control surface and a servomotor for operating said surface, roll and yaw angular accelerometer means producing signals proportional to roll and yaw angular accelerations, a lateral accelerometer producing a signal proportional to lateral acceleration, means for combining and integrating said lateral acceleration and said roll angular acceleration signals, and means for controlling said rudder motor from a summation of said yaw angular acceleration signal and said combined integral signal.

20. A yaw damper for aircraft having roll and yaw control surfaces and servomotors for operating the said surfaces, roll and yaw angular accelerometer means producing signals proportional respectively to the roll and yaw angular accelerations of said craft, a lateral accelerometer producing a signal proportional to the lateral accelerations of said craft, integrating means responsive to said lateral and roll acceleration signals, means for supplying the output of said integrating means and said yaw acceleration signal to said rudder servomotor for controlling the same in accordance with the summation of said signals, and means for supplying said roll acceleration signal to said aileron servomotor.

21. Automatic pilot apparatus for controlling an aircraft to approach a radio beam and to thereafter maintain said aircraft on said radio beam comprising means providing a first signal proportional to the displacement of said craft from said beam, means providing a second signal proportional to the rate of change of said radio signal, means providing a third signal proportional to the lateral acceleration of said craft, means for integrating said acceleration signal to thereby provide a fourth signal substantially proportional to the rate of lateral movement of said craft with respect to said beam, means responsive to said first and second signals for supplying a first output which varies in accordance with the algebraic sum thereof and adapted to control the approach of said craft toward said beam, means responsive to said first and fourth signals for supplying a second output which varies in accordance with the algebraic sum thereof and adapted to maintain said craft on said beam after said approach, and switch means having first and second positions for selectively controlling the craft in accordance with said first or second output signals, respectively.

22. Apparatus as set forth in claim 21 further including means responsive to a predetermined low value of said displacement signal for switching said switch means from said first position to said second position whereby to switch the control of said aircraft from said first output to said second output.

23. A radio beam coupler for automatic pilots for aircraft for controlling said craft automatically to approach and thereafter to be maintained on a selected radio beam, said automatic pilot including turn command means for causing turning of said craft, means providing a first signal variable in accordance with the algebraic sum of a signal proportional to the displacement of said craft from said beam and a signal proportional to the rate of change of said displacement signal, means for supplying a second signal variable in accordance with the algebraic sum of said beam displacement signal and a signal proportional to the lateral acceleration of said aircraft, means for integrating said second signal, and switch means responsive to the displacement of said craft from said beam for selectively supplying said first signal to said turn command means or said displacement signal and said integrated second signal to said turn command means.

24. In an automatic pilot for aircraft having a control surface for stabilizing the craft about one of its axes, a servomotor for adjusting said surface, means responsive to angular accelerations of the craft about said axis for providing a signal having a magnitude and sign which is a measure thereof, means responsive to the speed of operation of said control surface for producing a counter signal having a magnitude and sign which is a measure thereof, and means for controlling said servomotor from the algebraic sum of said signals.

25. An automatic pilot system for aircraft having control surfaces for controlling movements thereof about its pitch axis comprising a signal responsive servomotor system connected to actuate said surfaces, a pitch command signal generating means comprising a motor having an output signal generator driven by said motor, means for supplying the output of said signal generator to said servomotor system, manually operated means for providing a signal proportional to a desired rate of change of pitch attitude of said aircraft, means for supplying said desired pitch rate signal to said pitch command signal generating means, means normally controlling the response of said pitch command signal generating means such that said output signal generator rapidly produces an output signal proportional to said desired pitch rate signal, whereby to produce a rate of pitch of said craft proportional to said desired pitch rate, means for supplying a signal proportional to the displacement of said craft from a predetermined flight path, switch means for supplying said displacement signal to said pitch command signal generating means in place of said desired pitch rate signal, and means controlled by said switch means for changing the response of said pitch command signal generating means such that said signal generator slowly produces a signal only upon sustained displacements of said craft from said flight path whereby to produce a change in pitch attitude necessary to allow said sustained displacement signal to go to zero.

26. An automatic pilot for aircraft having control surfaces for controlling the movement thereof in pitch with respect to a predetermined flight path and servomotor means for controlling said surfaces comprising, means for producing a first signal proportional to the displacement of said craft from said flight path, means for supplying signals proportional to the pitch and roll attitude of said craft, accelerometer means for supplying a signal proportional to linear accelerations of said rraft with respect to its vertical axis, means for modifying said displacement and acceleration signals in accordance with a function of said roll attitude signal, integrating means responsive to said modified acceleration signal for providing a signal in accordance with a time integral thereof, and means responsive to said modified displacement, integral, and pitch attitude signals for controlling said servomotor in accordance with the algebraic sum thereof.

27. An automatic pilot for aircraft as set forth in claim 26 wherein said integrating means is also responsive to said displacement signal whereby to provide a further signal proportional to the time integral thereof and said servomotor control means is also responsive to said further integral signal.

28. An automatic pilot for aircraft as set forth in claim 26 further comprising means responsive to said modified displacement signal for limiting the same to a predetermined value to thereby limit the magnitude of the displacement signal supplied to said servomotor control means.

29. An automatic pilot for aircraft as set forth in claim 26 wherein the means for modifying said displacement signal in accordance with the roll attitude of said craft includes means for producing a signal proportional to craft air speed, and means for modifying said roll attitude signal in accordance with said air speed signal.

30. An automatic pilot system for aircraft having a control surface for moving said craft about an axis thereof comprising a hydraulic servomotor coupled with said surface, a source of high pressure hydraulic fluid, settable valve means for controlling the rate of flow of fluid from said source to said servomotor in accordance with the setting thereof whereby to control the rate of operation of said control surface, means for supplying a signal proportional to the displacement of said valve means, accelerometer means for measuring and supplying a signal proportional to angular accelerations of said craft about said axis, and means for controlling the displacement of said valve means in accordance with the algebraic sum of said signals whereby the rate of control surface movement is proportional to the angular accelerations of said craft about said axis.

31. In an automatic pilot system as set forth in claim 30 further including means responsive to movement of said control surface for providing a further signal in accordance with the rate of operation thereof and means for additionally controlling said valve means in accordance with said surface rate signal.

32. An automatic pilot system of the character set forth in claim 30 further including means responsive to said acceleration signal for providing a signal proportional to a transient time integral thereof, and means for further controlling said valve means in accordance therewith whereby to damp the operation of said valve control means.

33. A system of the character set forth in claim 2, further including means for varying the magnitude of said surface rate measure in accordance with a function of craft air speed.

References Cited in the file of this patent

UNITED STATES PATENTS

| | | |
|---|---|---|
| 2,368,673 | Metcalf | Feb. 6, 1945 |
| 2,595,309 | Slater | May 6, 1952 |
| 2,613,071 | Hansel | Oct. 7, 1952 |
| 2,644,941 | Kellogg | July 7, 1953 |
| 2,672,334 | Chenery | Mar. 16, 1954 |
| 2,759,689 | Owen | Aug. 21, 1956 |
| 2,776,807 | Noxon et al. | Jan. 8, 1957 |
| 2,784,924 | Gille | Mar. 12, 1957 |
| 2,801,816 | Meredith | Aug. 6, 1957 |
| 2,808,999 | Chenery | Oct. 8, 1957 |
| 2,834,563 | Miller | May 13, 1958 |
| 2,898,538 | Rafferty | Aug. 4, 1959 |